United States Patent
Petrucci et al.

(10) Patent No.: US 9,614,741 B2
(45) Date of Patent: Apr. 4, 2017

(54) VEHICLE ANTENNA SYSTEM AND METHOD FOR DETERMINING CONNECTIVITY STATUS THEREOF

(71) Applicant: GM Global Technology Operations LLC, Detroit, MI (US)

(72) Inventors: David R. Petrucci, Warren, MI (US); David Heiden, Clarkston, MI (US); Charles A. Massoll, Milford, MI (US); Duane S. Carper, Davison, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/815,379

(22) Filed: Jul. 31, 2015

(65) Prior Publication Data

US 2017/0034021 A1    Feb. 2, 2017

(51) Int. Cl.
*H04B 17/00* (2015.01)
*H04L 12/26* (2006.01)
*H04B 1/04* (2006.01)
*H04B 1/08* (2006.01)
*H04B 1/18* (2006.01)

(52) U.S. Cl.
CPC ............ *H04L 43/0811* (2013.01); *H04B 1/04* (2013.01); *H04B 1/082* (2013.01); *H04B 1/18* (2013.01)

(58) Field of Classification Search
CPC ... H01Q 3/267; H04M 1/6091; H04L 43/0811
USPC .............................. 455/67.14, 569.2
See application file for complete search history.

(56) References Cited

U.S. PATENT DOCUMENTS

| 6,313,799 B1* | 11/2001 | Thimm | H04B 7/08 343/703 |
|---|---|---|---|
| 2005/0273218 A1* | 12/2005 | Breed | B60C 11/24 701/2 |
| 2015/0236758 A1* | 8/2015 | Choi | H04B 5/02 455/41.1 |

\* cited by examiner

*Primary Examiner* — Ayodeji Ayotunde
(74) *Attorney, Agent, or Firm* — Reising Ethington, P.C.; Lionel D. Anderson (57) ABSTRACT

A vehicle communication system that includes an antenna system for a vehicle and a method of determining a connectivity status of the antenna system. The antenna system includes a test antenna for transmitting a wireless diagnostic signal with a signature waveform and a primary antenna that receives the wireless diagnostic signal and provides a corresponding wired diagnostic signal to a diagnostic circuit. The diagnostic circuit is configured to determine a connectivity status of the antenna system based on the presence or absence of the signature waveform in the wired diagnostic signal received from the primary antenna. It is possible for the diagnostic circuit to include a finite state machine (FSM) for carrying out the connectivity status determination.

14 Claims, 5 Drawing Sheets

VEHICLE ANTENNA SYSTEM AND METHOD FOR DETERMINING CONNECTIVITY STATUS THEREOF

FIELD

The present disclosure relates to vehicle antenna systems and more particularly to determining a connectivity status of a vehicle antenna.

BACKGROUND

Antenna devices on automotive vehicles are used to convert electro-magnetic waves into electrical power. Using such antenna devices, vehicles may receive various content data from local broadcasters (e.g., AM or FM radio), satellite radio, Wi-Fi, etc. The antenna devices may be connected with a radio head unit in the vehicle by a connecting coupler, which if disconnected or improperly connected may inhibit the head unit from providing radio content data to users in the vehicle. In the event that the connecting coupler becomes disconnected or improperly connected, the user may presume a problem with the head unit itself. Further, vehicle diagnostic systems may not identify certain connecting coupler and other issues. Thus, there exists a need to provide a system capable of determining a connectivity status in a vehicle antenna to address issues such as improper or inadequate connections in antenna device couplers.

SUMMARY

According to one embodiment, there is provided an antenna system for a vehicle. The antenna system may comprise: a test antenna mounted in the vehicle and configured to transmit a wireless diagnostic signal with a signature waveform; a primary antenna mounted in the vehicle and configured to receive the wireless diagnostic signal from the test antenna and to provide a wired diagnostic signal in response thereto; and a diagnostic circuit coupled to the primary antenna via a wired connection so as to receive the wired diagnostic signal. The diagnostic circuit is configured to evaluate the contents of the wired diagnostic signal and determine a connectivity status of the antenna system based on the presence or absence of the signature waveform.

According to another embodiment, there is provided a method of determining a connectivity status of an antenna system for a vehicle. The method may comprise the steps of: transmitting a wireless diagnostic signal with a signature waveform from a test antenna mounted in the vehicle to a primary antenna mounted in the vehicle; converting the wireless diagnostic signal into a wired diagnostic signal at the primary antenna; transmitting the wired diagnostic signal from the primary antenna to a diagnostic circuit via a wired connection; and evaluating the contents of the wired diagnostic signal and determining a connectivity status of the antenna system based on the presence or absence of the signature waveform.

DRAWINGS

Preferred exemplary embodiments will hereinafter be described in conjunction with the appended drawings, wherein like designations denote like elements, and wherein.

DESCRIPTION

A vehicle communication system is described below which is adapted to perform an intra-vehicle antenna system diagnosis. The diagnosis includes determining whether a primary antenna is properly connected and operating accordingly. The diagnosis is performed by providing a wireless signal from a test antenna to the primary antenna and providing an output of the primary antenna to a diagnostic circuit. Using the output, the diagnostic circuit is configured to determine a connectivity status of the primary antenna. For example, the connectivity status may be PASS when the primary antenna is properly connected, and the status may be FAIL when the primary antenna is entirely disconnected, partially connected, or improperly connected (e.g., polarity reversed or the like). In at least some implementations, the wireless signal provided by the test antenna includes a unique identifier or signature waveform which is used by the diagnostic circuit in determining antenna system connectivity.

Figure 1:
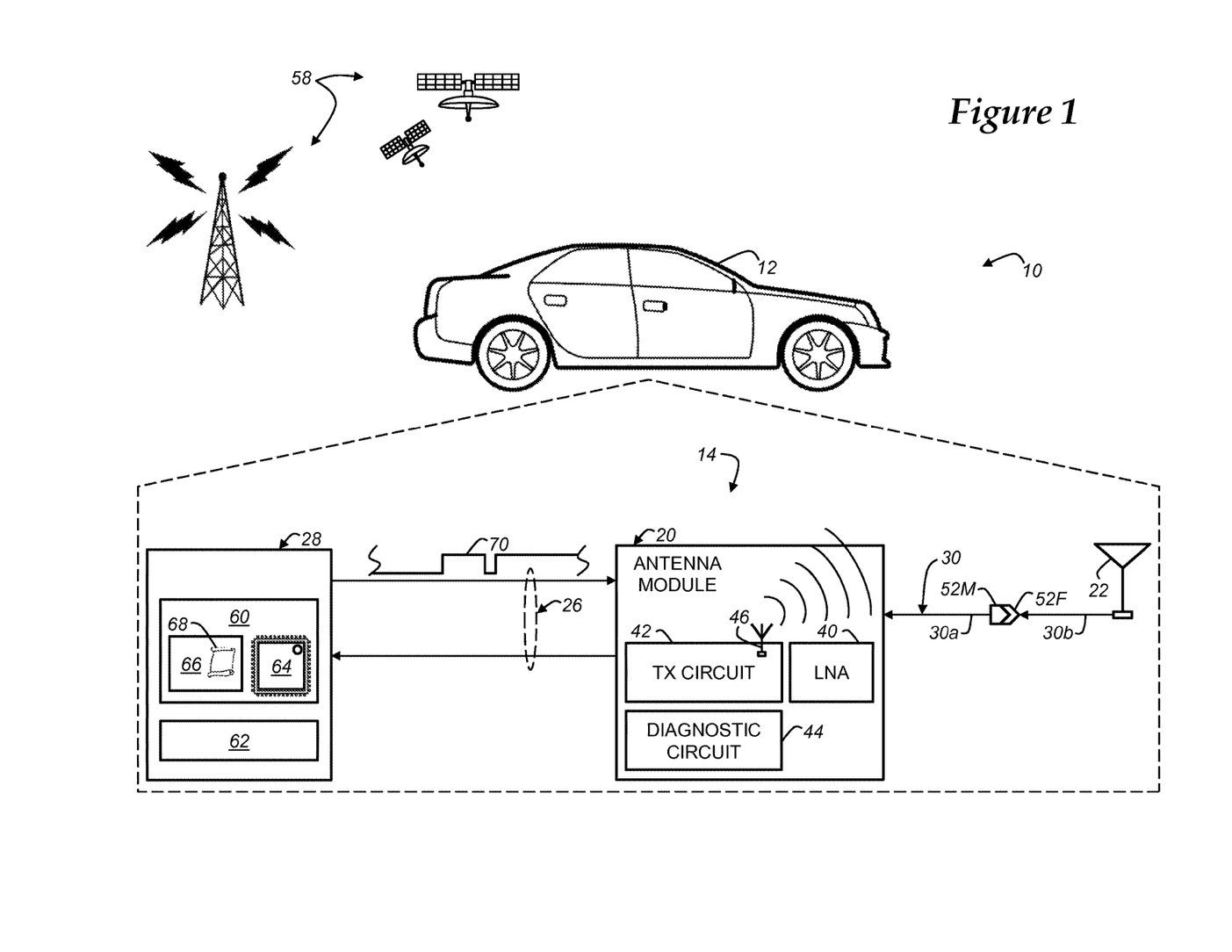
FIG. 1 is a block diagram depicting an embodiment of a vehicle with an antenna system.

FIG. 1 illustrates a vehicle 12 with an antenna system 14. Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Antenna system 14 is adapted for an intra-vehicle antenna system diagnosis. In at least one embodiment, antenna system 14 includes an antenna module 20, one or more primary antennas 22, a connection 26 between a vehicle head unit or vehicle infotainment system (VIS) module 28 and antenna module 20, and a connection 30 between the antenna module 20 and primary antenna 22.

Antenna module 20 may comprise a low noise amplifier (LNA) 40, a transmitter circuit 42, and a diagnostic circuit 44. LNA 40 may be any suitable electronic amplifier designed to receive signals from primary antenna 22. Thus, the LNA may be adapted to receive input signals from system 22 and provide an amplified output to VIS module 28 (e.g., via connection 26). The construction, implementation, and operation of LNAs are known to skilled artisans and will not be described in greater detail here.

Transmitter circuit 42 may include any circuit configured to broadcast or transmit a wireless signal using a test or secondary antenna 46. Test antenna 46 may be an omnidirectional antenna (e.g., dipole antenna), a directional antenna, a short range antenna, a low power antenna, and wavelength specific antennas, just to name a few non-limiting examples. In at least one implementation, test antenna 46 is positioned rather close to primary antenna 22, such that the two antennas are less than several meters apart. Also in some embodiments, test antenna 46 may have characteristics similar to primary antenna 22 (e.g., it may be configured to communicate via the same frequency ranges, have a similar size and/or shape, have similar quality or performance characteristics, etc.). In at least one implementation, the test antenna 46 is a directional antenna oriented towards primary antenna 22 so that any test signals transmitted from the test antenna to the primary antenna 22 require less energy and less likely to interfere with nearby electronic devices. In at least one embodiment, test antenna 46 may be an antenna dedicated for the purpose of connectivity diagnosis where circuit 42 and test antenna 46 may be specially adapted to transmit wireless transmissions or signals to one or more primary antennas 22 (e.g., having specially adapted power, frequency, and other signal characteristics). In at least one embodiment, one test antenna 46 is provided for each primary antenna 22 in vehicle 12; and in other embodiments, one test antenna 46 is adapted to provide wireless transmissions to multiple primary antennas 22. These wireless transmissions can be directional, low energy, short range and/or a combination thereof. Transmitter circuit 42 may include any suitable arrangement of components (e.g., one or more diodes, resistors, capacitors, inductors, amplifiers, oscillators, etc., as well as antenna 46); skilled artisans will appreciate a variety of transmitter circuit designs may be used to send a wireless signal from antenna 46 using a bandwidth receivable by the primary antenna 22. Implementations of the circuit 42 may include hardware, software, or any combination thereof.

Diagnostic circuit 44 may be any circuit configured to analyze an output or signal data received from the primary antenna 22 (e.g., via connection 30); implementations of the diagnostic circuit 44 also may include hardware, software, or any combination thereof. In at least one implementation, the diagnostic circuit is configured to operate as a finite state machine (FSM) and only uses hardware components; however, this is optional and is not mandatory. For example, a logic circuit without software and/or a microprocessor could be used, or in other embodiments, a microprocessor could be implemented to perform the logic steps of a predetermined FSM. In one implementation, the diagnostic circuit 44 may have a rapid response, e.g., without waiting for software systems to boot or startup at the time of a vehicle ignition event (e.g., startup of the engine of vehicle 12). This FSM embodiment will be described in greater detail below.

Figure 2:
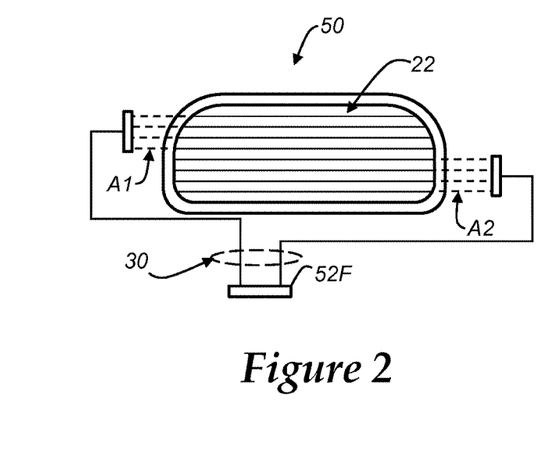
FIG. 2 illustrates one embodiment of a primary antenna.

Primary antenna(s) 22 may be configured to receive transmissions from the transmitter circuit 42 and antenna 46, as well as any other suitable transmission—including but not limited to receiving one or more of the following: AM radio signals, FM radio signals, satellite radio signals, telecommunication signals, global positioning system (GPS) signals, short range wireless communication signals (e.g., Bluetooth, Wi-Fi, Near-Field Communication, etc.), etc. In one implementation, at least some of the primary antenna(s) 22 (and accompanying antenna circuitry (not shown)) are adapted as receiving-only antennas (i.e., not transmitting antennas); however, this is not required. In addition, in at least some implementations, the primary antenna(s) 22 are omni-directional antennas (e.g., receiving and/or transmitting in all directions). FIG. 2 illustrates a vehicle rear window 50 having a resistive grid defroster which comprises at least a portion of the primary antenna 22. For example, in this implementation, a portion of the grid defroster may be a first primary antenna (A1) and another portion of the grid defroster may be a second primary antenna (A2)—both of which may be connected to antenna module 20 via connection 30. For example, antennas A1, A2 may be two FM antennas, one AM antenna and one FM antenna, or the like. This is merely meant to illustrate various arrangements of antennas 22 and is not intended to be limiting. Grid-type antenna arrangements are known; further, other antenna embodiments, such as monopole antennas, patch antennas, on-glass antennas, glued foil antennas, fractal antennas, GPS antennas, etc. could certainly be used as well.

Returning to FIG. 1, connection 26 is shown interconnecting VIS and antenna modules 28, 20. This may be a wired connection (e.g., a discrete connection (e.g., coaxial cable) or data bus), as illustrated, or in other embodiments, it may be wireless (e.g., a short range wireless communication technology such as Bluetooth, Wi-Fi, etc.).

Figures 3A, 3B:
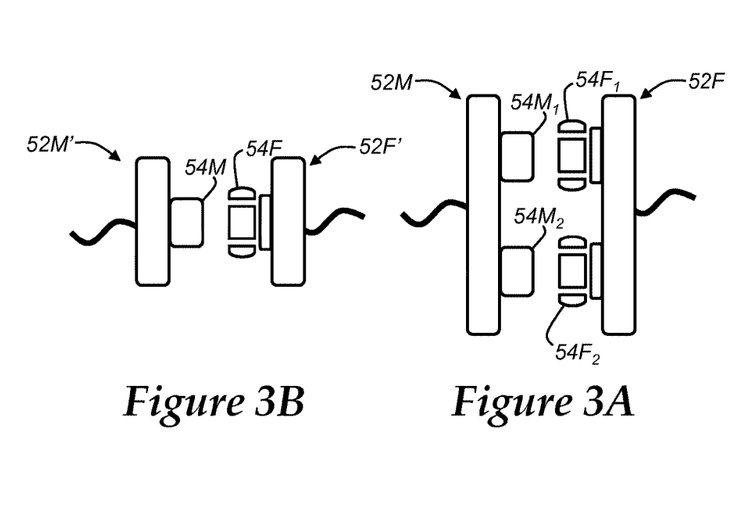
FIGS. 3A-3B illustrate embodiments of a connector which is part of the antenna system of FIG. 1.

Connection 30 may interconnect the primary antenna 22 and antenna module 20 and may have similar characteristics as connection 26; in at least one implementation, connection 30 may be wired. Connection 30 may comprise two portions 30a, 30b which are adjoined by connectors 52M, 52F (e.g., where connector 52M is a male connector and connector 52F is a female connector). As shown in FIG. 3A, connectors 52M, 52F each may have two terminals 54M$_1$, 54M$_2$ and 54F$_1$, 54F$_2$, respectively (which are illustrated here as snap terminals; however, this is not required). FIG. 3B illustrates a different connector embodiment 52M', 52F' (e.g., each connector having only one terminal 54M, 54F, respectively). Other connector implementations are possible; non-limiting examples include bayonet connectors (e.g., coaxial or otherwise), USB, any plug and socket arrangement, etc.; other types or styles of connectors are also possible.

Returning again to FIG. 1, vehicle infotainment system (VIS) module 28 may be an embedded vehicle device (e.g., in the center stack of vehicle 12). The module 28 may receive radio frequency (RF) transmissions from one or more transmitting devices 58 (e.g., radio towers, telecommunication or cellular stations, satellites, etc.) via antenna system 22 and convert the transmissions to audible sound, video, data, etc. so that users of vehicle 12 may receive content data thereby. VIS module 28 may comprise, among other things, an electronic control unit (ECU) 60 and a power circuit 62—at least one of which may be part of the antenna system 14.

ECU 60 includes one or more processors 64 and memory 66 which may store data and instructions for carrying out at least a portion of the method disclosed herein. Processor(s) 64 may be any type of device capable of processing electronic instructions including microprocessors, microcontrollers, host processors, controllers, vehicle communication processors, and application specific integrated circuits (ASICs). It can be a dedicated processor used only for VIS module 28 or can be shared with other vehicle systems (e.g., with antenna module 20). Processor 64 may execute various types of digitally-stored instructions, such as software or firmware program(s) 68 (in memory 66). In at least one embodiment, program(s) 68 provide a signature waveform 70 which is used to determine the connectivity status of primary antenna 22. This will be described in greater detail below.

Memory 66 may include any suitable non-transitory computer usable or readable medium, which may include one or more storage devices or articles. In at least one implementation, at least a portion of memory 66 may be comprised within processor 64 (e.g., in a microprocessor). Exemplary non-limiting computer usable storage devices include conventional computer system RAM (random access memory), ROM (read only memory), EPROM (erasable, programmable ROM), EEPROM (electrically erasable, programmable ROM), and magnetic or optical disks or tapes. These of course are merely examples and other examples exist.

Power circuit 62 includes an electrical circuit configured to provide power to VIS module 28 (e.g., from a vehicle power source such as a vehicle battery). The power circuit 62 may include one or more conventional power components (e.g., a voltage regulator circuit, a ripple control or power conditioning circuit, a reverse polarity protection circuit, etc.). In at least one embodiment, the power circuit 62 further comprises one or more electronic components arranged to provide a signature waveform 70 to antenna module 20. For example, the signature waveform 70 may be generated as part of or in response to each vehicle ignition event (e.g., when the vehicle is turned on with the ignition), whenever the VIS module 28 is actuated ON (e.g., when a user engages the power or on/off button on the VIS module and turns the module ON), or both. In at least one implementation, the power circuit 62 provides the signature waveform by rapidly turning the VIS module 28 ON and OFF in a predefined, repeatable sequence (and this ON-OFF sequence defines the signature waveform 70 which will be used during the intra-vehicle antenna system diagnosis). The sequence may be rapid enough that a user of vehicle 12 may not perceive this occurrence, thereby improving the user experience (e.g., the duration of the ON-OFF sequence may be 1-3 seconds).

Method

Figure 4:
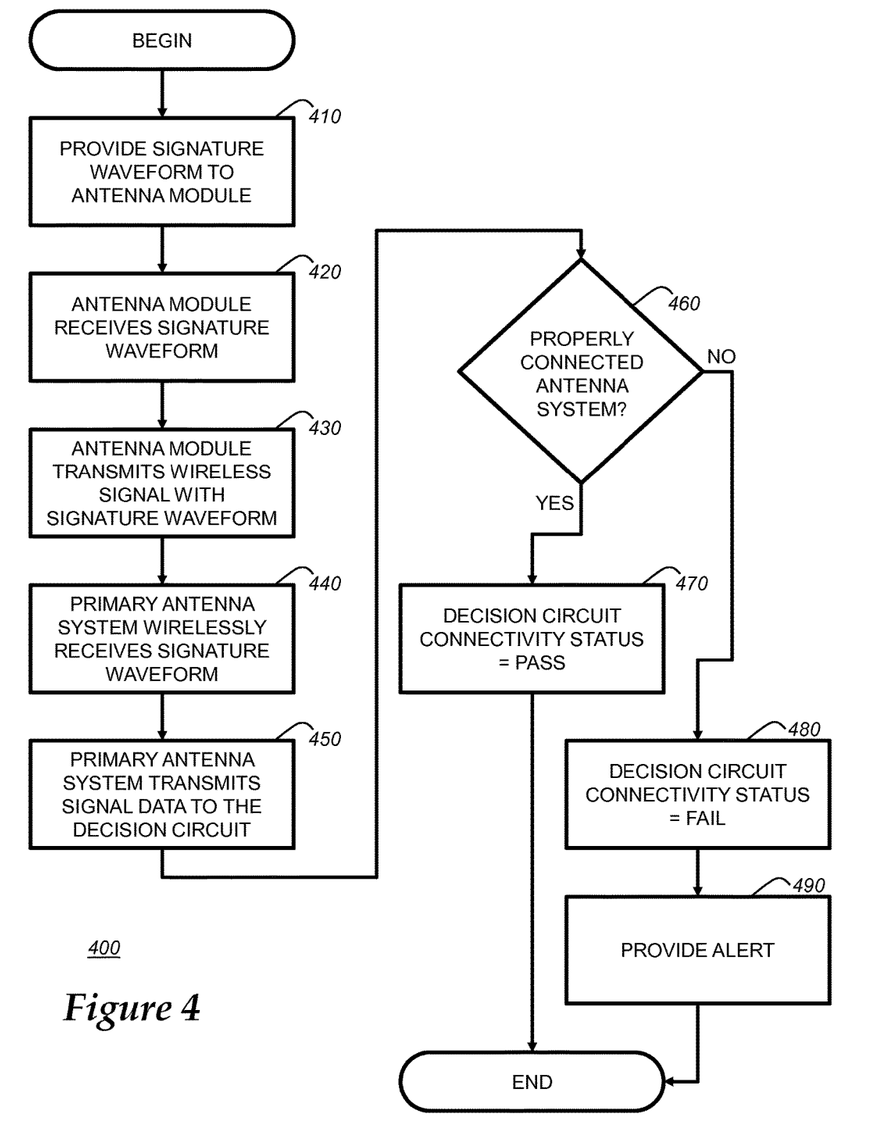
FIG. 4 is a flow diagram depicting a method of determining an antenna connectivity status.

Turning now to FIG. 4, a flow diagram is shown illustrating a method 400 for determining an antenna connectivity status. The method 400 begins with step 410 wherein VIS module 28 provides an electrical signal that includes the predetermined or preconfigured signature waveform 70 to antenna module 20. According to one implementation, ECU 60 provides signature waveform 70 to antenna module 20 at a time when the VIS module 28 is powered ON. As discussed above, the VIS module 28 may be switched ON (e.g., by a pushbutton, touch screen switch, etc.) or the VIS module 28 may be powered ON when the vehicle is turned on (e.g., following an ignition event). In one implementation, as a result of the VIS module 28 being powered ON, waveform 70 is called up from memory 66 according to instructions 68 executed by processor 64 and thereafter is transmitted via connection 26. In another implementation, ECU 60 receives a signal or indication that the VIS module 28 has been powered (e.g., via power circuit 62) and, in response to the indication, ECU 60 transmits signature waveform 70 to the antenna module 20. In yet other embodiment, the power circuit 62 provides the signature waveform 70 as opposed to the ECU 60. For example, as discussed above, power circuit 62 can be configured (using discrete electronic components) to rapidly switch the VIS module 28 ON and OFF according to a predetermined sequence; and this sequence may generate the signature waveform 70 which is sent to antenna module 20. In still yet other embodiments, signature waveform 70 could be transmitted at a time other than the VIS module 28 powering ON (e.g., periodically or at scheduled intervals or as a result of a manually operated antenna system check (e.g., by the user or a service technician)). Other circuits or devices could initiate method 400 as well by transmitting signature waveform 70 (e.g., other ECUs and/or vehicle system modules such as a body control module or the like).

Figures 5, 6:
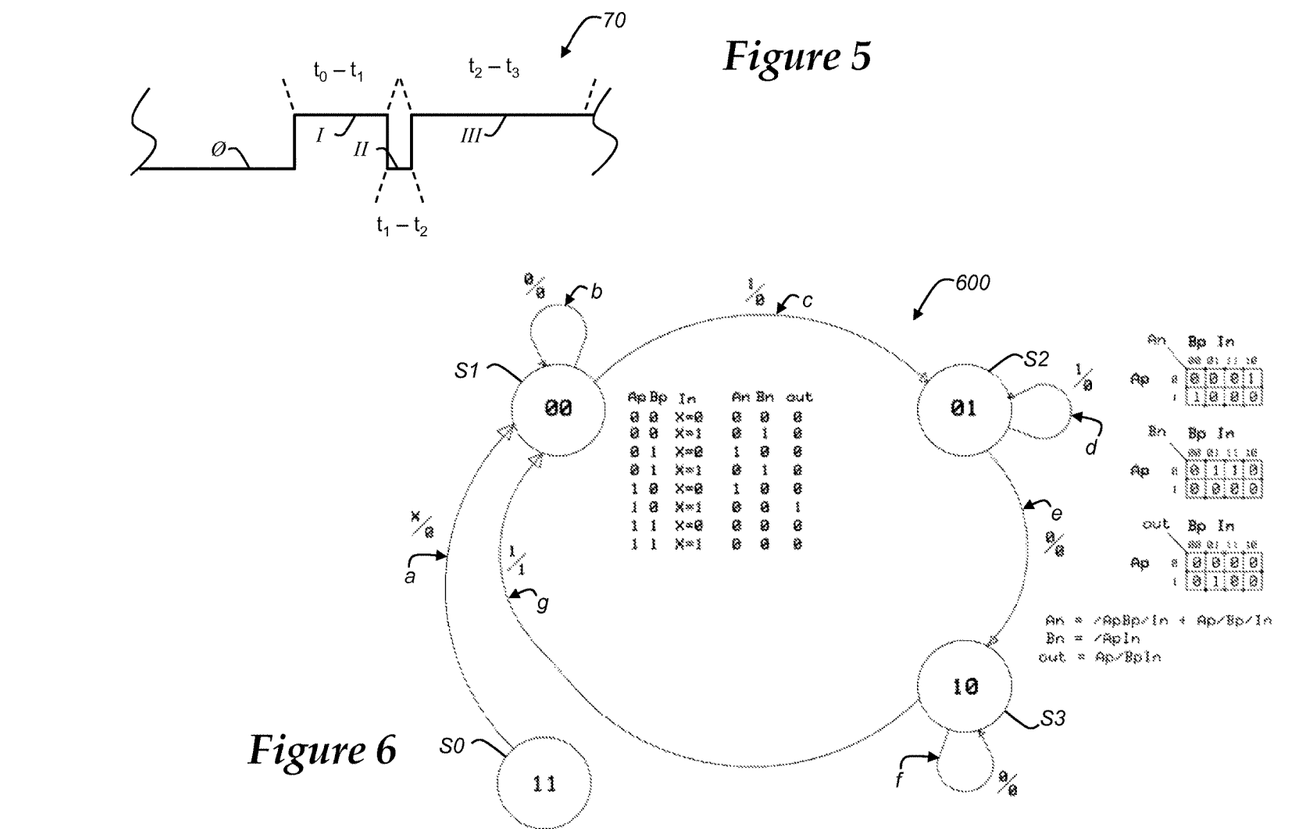
FIG. 5 illustrates an embodiment of a signature waveform.
FIG. 6 illustrates a finite state machine diagram.

Signature waveform 70 may be a digital or an analog electrical signal. In at least one implementation, the waveform 70 is digital as illustrated in FIG. 5 and has a sequence of digital ones ("1" or 5V) and zeros ("0" or 0V); e.g., in this non-limiting example, the signature waveform is a digital '101.' As will become apparent in the discussion below, the sequence of digital ones and zeros may enable the diagnostic circuit 44 to identify the connectivity status of the primary antenna 22. FIG. 5 more specifically illustrates an electrical signal that includes an exemplary or non-limiting signature waveform 70; e.g., a first portion of the electrical signal (Ø) represents a period of time when the VIS module 28 is powered OFF (null or digital "0") and portions I, II, and III represent the signature waveform 70 after the VIS module 28 is turned ON. Portion I is a digital "1" having a duration of $t_0 \rightarrow t_1$ (seconds). Portion II is a digital "0" having a duration of $t_1 \rightarrow t_2$ (seconds). And portion III is a digital "1" having a duration of $t_2 \rightarrow t_3$ (seconds). In one example, $t_0 \rightarrow t_1$ is approximately 200 milli-seconds, $t_1 \rightarrow t_2$ is approximately 30 milli-seconds, and $t_2 \rightarrow t_3$ is considered a relatively long time (e.g., approximately at least 50 milli-seconds). The durations above may enable the identification of the signature waveform 70 (which may be characterized by a digital format—e.g., digital "1s" and "0s") without the use of a clock (e.g., using Euler's Decay). It should be appreciated that this illustrated signature waveform is merely an example (and other implementations will be apparent to skilled artisans). For example, more or fewer digital "1s" and/or "0s" may be used. Or for example, in analog implementations, the digital "1s" and "0s" may be replaced with threshold value(s)—e.g., an output voltage less than a predetermined threshold may correspond with a digital "0" and an output voltage greater than a predetermined threshold may correspond with a digital "1."

Returning to FIG. 4, in step 420, the antenna module 20 receives the signature waveform 70. For example, antenna module 20 may receive the signature waveform 70 via a coaxial cable 26 in at least one wired embodiment. Following step 420, the method proceeds to step 430.

In step 430, transmitter circuit 42 causes test antenna 46 to transmit a wireless diagnostic signal with a signature waveform 70. The waveform 70 is transmitted in order to determine a connectivity status of the primary antenna 22. For example, as will be explained in greater detail below, a successful diagnostic test will include the signature waveform being transmitted from the test antenna 46, received by the primary antenna 22, and then conveyed to the diagnostic circuit 44 where it is determined that the signal received by the primary antenna includes the signature waveform. In at least one embodiment, the transmission power may be small enough that transmission is localized; e.g., sufficiently strong to be received by the primary antenna(s) 22; however, small enough to attenuate at or closely around vehicle 12 (e.g., so as to avoid detection by malicious parties, minimize interference with other electronic devices, etc.). Step 440 may follow.

In step 440, primary antenna 22 wirelessly receives the signature waveform 70 via an intra-vehicle transmission. As discussed above, the test antenna 46 may be adapted to communicate with the primary antenna 22; e.g., the test antenna may broadcast at a frequency receivable by primary antenna 22. And in at least one implementation, the LNA 40 is used to amplify the intra-vehicle transmission so that signature waveform 70 carried thereby can be resolved or identified. The wireless transmission may be transduced into an electrical signal using techniques known in the art. At least a portion of the signal may comprise signal data that represents the signature waveform 70. Method 400 may then proceed to step 450.

In step 450, the primary antenna 22 provides a wired diagnostic signal to the diagnostic circuit 44. Skilled artisans will understand that when antennas, such as primary antenna 22, receive electromagnetic waves this causes electrons to vibrate in the antenna. The vibrating electrons, in turn, create a corresponding electrical current that recreates or represents the original signal from the wireless signal. In step 450, primary antenna 22 creates or produces a signal (called a "wired diagnostic signal" because it is transmitted over wired connection 30) that is in response to the wireless diagnostic signal received from test antenna 46. When the wired diagnostic signal is provided to circuit 44, the signal data passes through connection 30b, connectors 52F, 52M, and connection 30a. When the antenna connection 30 has a faulty condition (e.g., due to the connection between connectors 52F, 52M or otherwise), the signal data may not be similarly received at the diagnostic circuit 44. For example, if connectors 52F and 52M are entirely disconnected, no signal data may be received at diagnostic circuit 44. Or if connectors 52F and 52M are partially disconnected, then only a portion of the signal data may transmit to the diagnostic circuit 44. Or if connectors 52F and 52M are connected but the connection is reversed (e.g., $54F_1$ is connected to $54M_2$ and $54F_2$ is connected to $54M_1$), then the signal data may be transmitted to the diagnostic circuit 44; however, the signature waveform will be altered. Other sets of circumstances could also lead to a mis-connection between primary antenna 22 and antenna module 20 as well. Following step 450, method 400 may proceed to step 460.

In step 460, the diagnostic circuit 44 determines whether the primary antenna 22 is connected properly. In some implementations, the diagnostic circuit 44 may power-up at the vehicle ignition event. And where no wired diagnostic signal is received by circuit 44 within a predetermined period of time (of the vehicle ignition event), the diagnostic circuit 44 may determine that connectors 52F and 52M are entirely disconnected (e.g., primary antenna 22 is not connected) or that a disconnection exists in another portion of antenna system 14. When a wired diagnostic signal is received within the predetermined period of time and the signal data carries the signature waveform 70, then diagnostic circuit 44 may determine that the antenna system 22 is connected properly; e.g., diagnostic circuit 44 may compare the received signal data to a known or stored signature waveform (e.g., using a processor and/or other electronic circuitry) and determine a match. In other instances, when diagnostic circuit 44 receives at least partial signal data, circuit 44 may determine that the at least partial signal data does not represent a known or stored signature waveform; consequently, the circuit 44 may determine an improper connection with antenna system 22. For example, if the wired diagnostic signal includes a '010' rather than a '101,' then circuit 44 may determine the connection is reversed (e.g., $54F_1$ is connected to $54M_2$ and $54F_2$ is connected to $54M_1$). Or for example, if one or more "1s" and "0s" are received but the circuit 44 determines the order does not match the signature waveform, then the diagnostic circuit may determine a partial connection.

FIG. 6 shows a diagram of a finite state machine (FSM) 600 which illustrates one embodiment of how a determination may be made using the diagnostic circuit 44. It should be appreciated that the FSM may represent an electrical signal or signal data being presented to a logic circuit (e.g., one or more AND gates, NAND, gates, OR gates, etc.); or in other implementations, the FSM 600 may or may not be implemented using a microprocessor or the like. In this example, the FSM 600 validates the signature waveform 70 shown in FIG. 5 (e.g., a digital 101) without the use of a microprocessor. The FSM 600 includes four states S0 (not started), S1 (having received a digital "1"), S2 (having received next a digital "0"), and S3 (having received next a digital "1"). In operation, the FSM 600 begins in state S0, and when power is provided to VIS module 28, the FSM receives input of either a "0" or a "1" (shown as an "X"), outputs a "0," and proceeds to state S1 [shown as path 'a'].

In state S1, if a "0" is received as input, state S1 outputs a "0" and remains in state S1 [shown as path t']. However, if a "1" is received as input within the expected time period for section I of the signal 70, then state S1 outputs a "0" and proceeds to state S2 [shown as path 'c'].

In state S2, if a "1" is received as input, state S2 outputs a "0" and remains in state S2 [shown as path 'd']. However, if a "0" is received as input within the expected time period for section II of the signal 70, state S2 outputs a "0" and proceeds to state S3 [shown as path 'e'].

In state S3, if a "0" is received as input, state S3 outputs a "0" and remains in state S3 [shown as path T]. However, if a "1" is received as input within the expected time period for section III of the signal 70, state S3 outputs a "1" and proceeds again to state S1 [shown as path 'g']. The FSM output of a digital "1" indicates the signature waveform 70 has been verified or validated, and the diagnostic circuit 44 may determine a connectivity status of PASS. The "1" output may be an electrical signal to VIS module 28 (or any other suitable diagnostic device in vehicle 12) indicating that the primary antenna 22 is properly connected. In this example, a digital '101' has been verified. According to at least one implementation, the '101' could be verified again as desired beginning with state S1, proceeding as described above (e.g., the FSM 600 is reset and may await a trigger to redetermine the connectivity status—e.g., by a vehicle device or manual input (e.g., from a user or service personnel)). If the FSM output remains "0" or is "0" after the predetermined period of time, then the "0" output may be an electrical signal provided to VIS module 28 (or to any other suitable vehicle diagnostic device) indicating that the primary antenna 22 is not properly connected.

It should be appreciated that other sequences of "0s" and "1s" may be verified also using differently arranged FSMs. Further, as discussed above, in at least one implementation, use of FSM 600 does not require software which may necessitate longer boot-up or start-up times (e.g., may be constructed using transistors and/or integrated logic circuits). Further, in at least one embodiment, the signature waveform 70 may be verified within a predetermined time period from vehicle start-up, else the diagnostic circuit 44 may determine a connectivity status indicating FAIL. Thus, when diagnostic circuit 44 determines a PASS, the circuit determines that the primary antenna 22 is properly connected and operating. And when diagnostic circuit 44 determines a FAIL, the circuit determines that the primary antenna 22 is not properly connected.

Returning to FIG. 4, having determined in step 460 whether the primary antenna 22 is (or is not) properly connected, the method 400 proceeds to step 470 or step 480. The method 400 proceeds to step 470 when system 22 is properly connected (e.g., when the connectivity status equals PASS). And the method 400 proceeds to step 480 when system 22 is not properly connected (e.g., when the connectivity status equals FAIL).

In step 470, the diagnostic circuit 44 outputs a connectivity status (e.g., PASS) to VIS module 28 via connection 26 indicating a properly functioning antenna system 14. Again, this may be associated with the FSM 600 providing a "1" output (or may be associated with any other output from diagnostic circuit 44 indicating a PASS connectivity status). Having received this connectivity status, VIS module 28 may perform normally or as expected. After step 470, the method 400 could end or continue with some other sequence of steps.

And in step 480, diagnostic circuit 44 outputs a connectivity status (e.g., including FAIL) to VIS module 28 via connection 26 indicating an improperly functioning antenna system 14. Again, this may be associated with the FSM 600 providing a "0" output and/or not completing the determination within a predetermined period of time (or may be associated with any other output from diagnostic circuit 44 indicating a FAIL connectivity status). Step 480 may further include other information regarding the connectivity status as well. For example, the status may indicate whether connectors 52M, 52F are partially connected, not at all connected, or reversedly connected, just to name a few examples. In addition, where multiple primary antennas 22 are used on vehicle 12, the connectivity status may further indicate which antenna(s) 22 are experiencing connection issues. For example, diagnostic circuit 44 may determine a connectivity status of an FM antenna, an AM antenna, a satellite antenna, a cellular antenna, a short range wireless communication antenna, or any combination thereof. These determinations may occur consecutively or at least partially concurrently. And as will be explained below, one or more diagnostic circuits 44 could be used in other embodiments. After step 480, the method 400 proceeds to step 490.

In step 490, the VIS module 28 may provide an alert. This alert may be directed to a vehicle user, an onboard-diagnostics system (e.g., OBD II), or a vehicle backend system (e.g., in telematics-equipped vehicles). Following step 490, the method 400 may end.

Other embodiments are contemplated also. For example, while the determination of a connectivity status has been described with respect to vehicle ignition event, the status could be determined at any suitable or desirable time during vehicle operation (e.g., randomly or at regular intervals)—e.g., automatically by a vehicle ECU or system module, as triggered by a vehicle user or vehicle service technician, etc.

Figure 7:
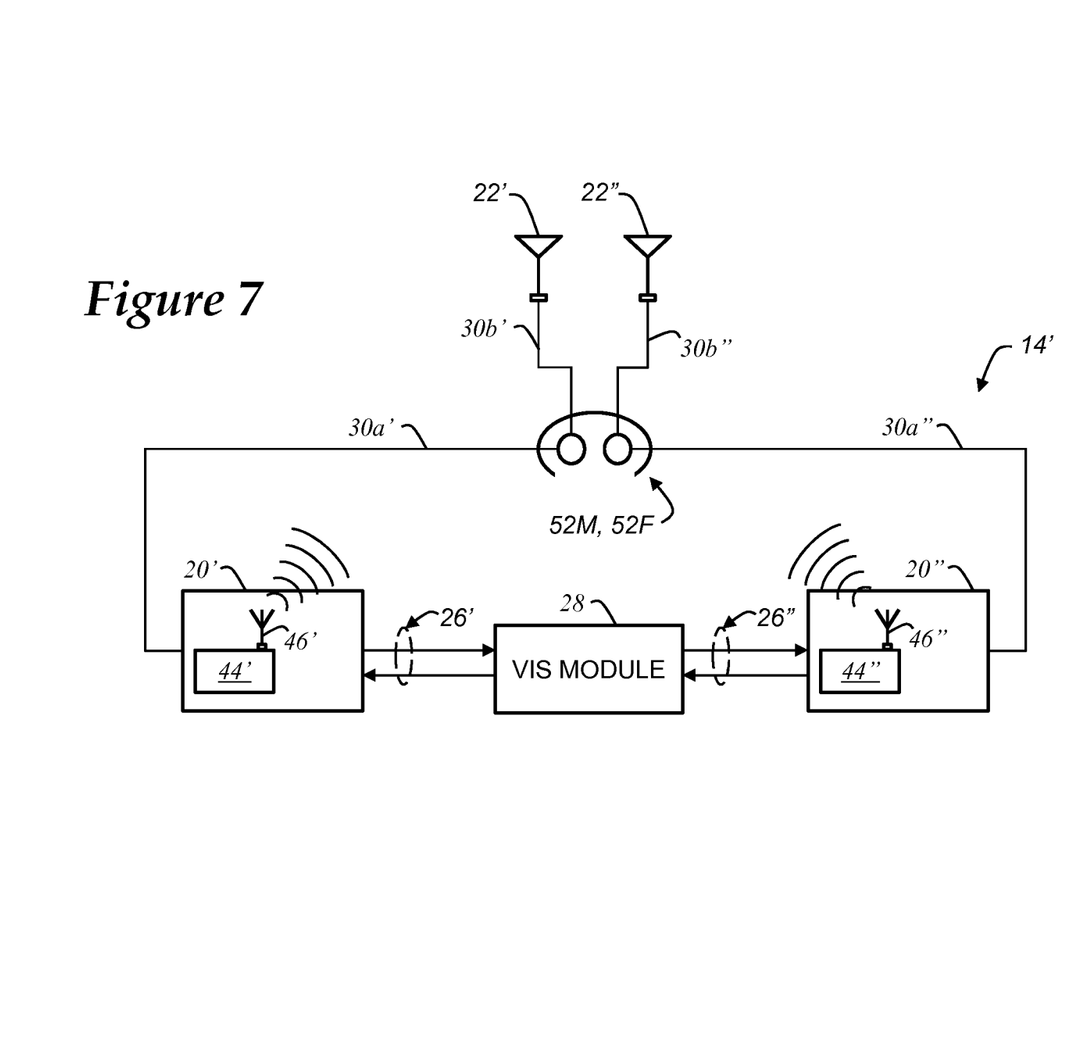
FIG. 7 shows another embodiment having two primary antennas.

In other embodiments (see FIG. 7), the antenna system 14' may have multiple diagnostic circuits 44', 44"—e.g., each associated with different antennas 22', 22" (respectively). Here, like reference numeral represent identical or like elements or similar functions previously described. The implementation shown in FIG. 7 may be desirable when primary antennas 22', 22" are located in different regions of vehicle 12. This is merely one example; other arrangements are also possible.

Figure 8:
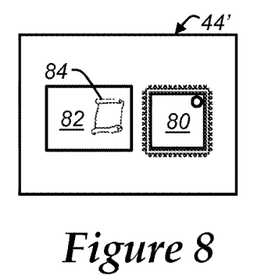
FIG. 8 illustrates an embodiment of a diagnostic circuit.

In another embodiment (see FIG. 8), diagnostic circuit 44' could include a processor 80 and memory 82 having one or more software applications 84 stored thereon and executable by processor 80. The characteristics of the processor 80 and memory 82 may be similar to the processor 64 and memory 66 of VIS module 28 and will not be re-described here; however, it will be appreciated that processor 80 and memory 82 may be specially adapted for diagnostic circuit 44' (rather than the VIS module) to determine the connectivity status discussed above. For example, in one embodiment, the FSM could be implemented using the processor 80 and memory 82. Or the processor 80 otherwise may be used to determine the connectivity status.

In other embodiments, the signature waveform could be transmitted to antenna module 20 by another ECU (not shown)—e.g., located elsewhere in vehicle 12 (e.g., in a vehicle system module or the like). For example, the antenna module 20 could provide the transmitter circuit 42 with the signature waveform (e.g., derived or stored therein). Also, it should be appreciated that a connectivity status of any antenna in vehicle 12 may be determined using a test antenna and a diagnostic circuit; i.e., the antenna need not directly associated with VIS module 28. For example, a GPS antenna could be tested, a cellular antenna could be tested, a short range wireless communication antenna (e.g., for Bluetooth, Wi-Fi, or the like), could be tested, just to name a few examples. In each of these instances, the test antenna may transmit a test or diagnostic signal that includes a signature waveform to an onboard antenna, and the respective diagnostic circuit may determine a connectivity status.

Thus, there has been described a vehicle communication system adapted to perform an intra-vehicle antenna system diagnosis; e.g., determining an antenna connectivity status. The communication system may include a test antenna and a primary antenna to be tested for connectivity. The test antenna may transmit a wireless diagnostic signal to the primary antenna, the primary antenna may provide a corresponding wired diagnostic signal to a diagnostic circuit, and the diagnostic circuit may determine the connectivity status based on that signal. In at least some implementations, the test antenna may transmit a unique identifier or waveform which may be used by the diagnostic circuit to determine the connectivity status.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. For example, the specific combination and order of steps is just one possibility, as the present method may include a combination of steps that has fewer, greater or different steps than that shown here. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. An antenna system for a vehicle, comprising:
    a test antenna mounted in the vehicle and configured to transmit a wireless diagnostic signal with a signature waveform, wherein the test antenna is coupled to a vehicle infotainment system (VIS) module that includes an electronic control unit (ECU) and that also provides the signature waveform;
    a primary antenna mounted in the vehicle and configured to receive the wireless diagnostic signal from the test antenna and to provide a wired diagnostic signal in response thereto; and
    a diagnostic circuit coupled to the primary antenna via a wired connection so as to receive the wired diagnostic signal, wherein the diagnostic circuit is configured to evaluate the contents of the wired diagnostic signal and determine a connectivity status of the antenna system based on the presence or absence of the signature waveform.

2. The antenna system of claim 1, wherein the test antenna is a short-range, transmit-only antenna configured to directionally transmit the wireless diagnostic signal with the signature waveform to the primary antenna.

3. The antenna system of claim 1, wherein the primary antenna is configured to receive the wireless diagnostic signal from the test antenna as well as wireless signals from one or more of the following sources: an AM radio broadcaster, an FM radio broadcaster, a global position system (GPS) satellite, a telecommunications network, or a short range wireless network.

4. The antenna system of claim 3, wherein the primary antenna is coupled to the VIS module and provides the VIS module with content for operation.

5. The antenna system of claim 1, wherein the diagnostic circuit includes a finite state machine (FSM) that is configured to evaluate the contents of the wired diagnostic signal without a central processing unit (CPU) and to determine a connectivity status of the antenna system based on the presence or absence of the signature waveform.

6. The antenna system of claim 1, wherein the wired connection that couples the primary antenna to the diagnostic circuit includes a male connector and a female connector, and the diagnostic circuit is configured to evaluate the contents of the wired diagnostic signal and determine a connectivity status of the male and female connector based on the presence or absence of the signature waveform.

7. The antenna system of claim 1, wherein the VIS module provides the test antenna with a signature waveform that includes a predetermined series of "0" and "1" data when the VIS module is powered on, and the diagnostic circuit is configured to detect the same predetermined series of "0" and "1" from the wired diagnostic signal.

8. The antenna system of claim 7, wherein the VIS module provides the test antenna with the signature waveform in response to an ignition event.

9. The antenna system of claim 1, further comprising a second primary antenna mounted in the vehicle and configured to receive a second wireless diagnostic signal from the test antenna and to provide a second wired diagnostic signal in response thereto, wherein a diagnostic circuit is configured to evaluate the contents of the second wired diagnostic signal and determine a connectivity status of the second primary antenna.

10. A method of determining a connectivity status of an antenna system for a vehicle, the method comprising the steps of:
(a) transmitting a wireless diagnostic signal with a signature waveform from a test antenna mounted in the vehicle to a primary antenna mounted in the vehicle, wherein the test antenna is coupled to a vehicle infotainment system (VIS) module having an electronic control unit (ECU), the transmitting step further comprising transmitting the wireless diagnostic signal in response to receiving the signature waveform from the VIS module;
(b) converting the wireless diagnostic signal into a wired diagnostic signal at the primary antenna;
(c) transmitting the wired diagnostic signal from the primary antenna to a diagnostic circuit via a wired connection; and
(d) evaluating the contents of the wired diagnostic signal and determining a connectivity status of the antenna system based on the presence or absence of the signature waveform.

11. The method of claim 10, wherein transmitting step (a) further comprises transmitting the wireless diagnostic signal with a signature waveform that includes a predetermined series of "0" and "1" data in response to the VIS module being powered on, wherein evaluating step (b) further comprises evaluating the contents of the wired diagnostic signal by detecting the same predetermined series of "0" and "1".

12. The method of claim 11, wherein transmitting step (a) further comprises transmitting the wireless diagnostic signal in response to an ignition event.

13. The method of claim 10, wherein the evaluating step (d) further comprises evaluating the contents of the wired diagnostic signal using a finite state machine (FSM) without a central processing unit (CPU) and determining a connectivity status of the antenna system based on the presence or absence of the signature waveform.

14. An antenna system for a vehicle, comprising:
a test antenna mounted in the vehicle and configured to transmit a wireless diagnostic signal with a signature waveform;
a first primary antenna mounted in the vehicle and configured to receive the wireless diagnostic signal from the test antenna and to provide a first wired diagnostic signal in response thereto;
a second primary antenna mounted in the vehicle and configured to receive the wireless diagnostic signal from the test antenna and to provide a second wired diagnostic signal in response thereto; and
at least one diagnostic circuit coupled to the first and second primary antennas via at least one wired connection so as to receive the first and second wired diagnostic signals, wherein the at least one diagnostic circuit is configured to evaluate the contents of the first and second wired diagnostic signals and determine a connectivity status of each of the first and second primary antennas based on the presence or absence of the signature waveform.

* * * * *